United States Patent
Chen (12)

(10) Patent No.: US 9,329,405 B1
(45) Date of Patent: May 3, 2016

(54) TEMPLE ASSEMBLY FOR EYEGLASSES

(71) Applicant: Joy Chen, Tainan (TW)

(72) Inventor: Joy Chen, Tainan (TW)

( * ) Notice: Subject to any disclaimer, the term of this patent is extended or adjusted under 35 U.S.C. 154(b) by 0 days.

(21) Appl. No.: 14/670,273

(22) Filed: Mar. 26, 2015

(51) Int. Cl.
*G02C 5/20* (2006.01)
*G02C 5/14* (2006.01)
*G02C 5/22* (2006.01)

(52) U.S. Cl.
CPC .. *G02C 5/20* (2013.01); *G02C 5/14* (2013.01); *G02C 5/22* (2013.01)

(58) Field of Classification Search
CPC ............ G02C 5/20; G02C 5/14; G02C 5/146; G02C 2200/24; G02C 5/22
USPC ......................................................... 351/115
See application file for complete search history.

(56) References Cited

U.S. PATENT DOCUMENTS

| | | | | |
|---|---|---|---|---|
| 5,076,681 A | * | 12/1991 | Lhospice | ............... G02C 5/143 351/115 |
| 5,521,654 A | * | 5/1996 | Bertieri | ............... G02B 25/004 351/115 |
| 6,641,260 B1 | * | 11/2003 | Avital | ................... G02C 5/006 351/115 |
| 7,241,008 B2 | * | 7/2007 | Hammock | ............... G02C 5/20 351/118 |
| 2001/0024262 A1 | * | 9/2001 | Kim | ........................ G02C 5/20 351/113 |
| 2004/0130674 A1 | * | 7/2004 | Epstein | .................. G02C 5/005 351/115 |
| 2005/0146675 A1 | * | 7/2005 | Benavides | ............. G02C 5/001 351/115 |
| 2015/0049292 A1 | * | 2/2015 | Wilson | ................... G02C 11/10 351/51 |

\* cited by examiner

*Primary Examiner* — Bumsuk Won
*Assistant Examiner* — Grant Gagnon

(57) ABSTRACT

Eyeglasses includes a frame, two connecting blocks, and two temples. A front end of each connecting block is pivotably connected to a side of the frame. A rear end of each connecting block includes an axle having a first positioning portion. A rear end of each temple has a hook. A front end of each temple includes a receptacle receiving one of the axles. The receptacle of each temple includes an inner periphery having a second positioning portion engaged with the first positioning portion of one of the connecting blocks, such that the temples are pivotable relative to the connecting blocks to change an angular position of each hook. The first and second positioning portions engage with each other to fix the angular position of the hook. A disengagement prevention mechanism is provided between each temple and one of the connecting blocks.

6 Claims, 10 Drawing Sheets

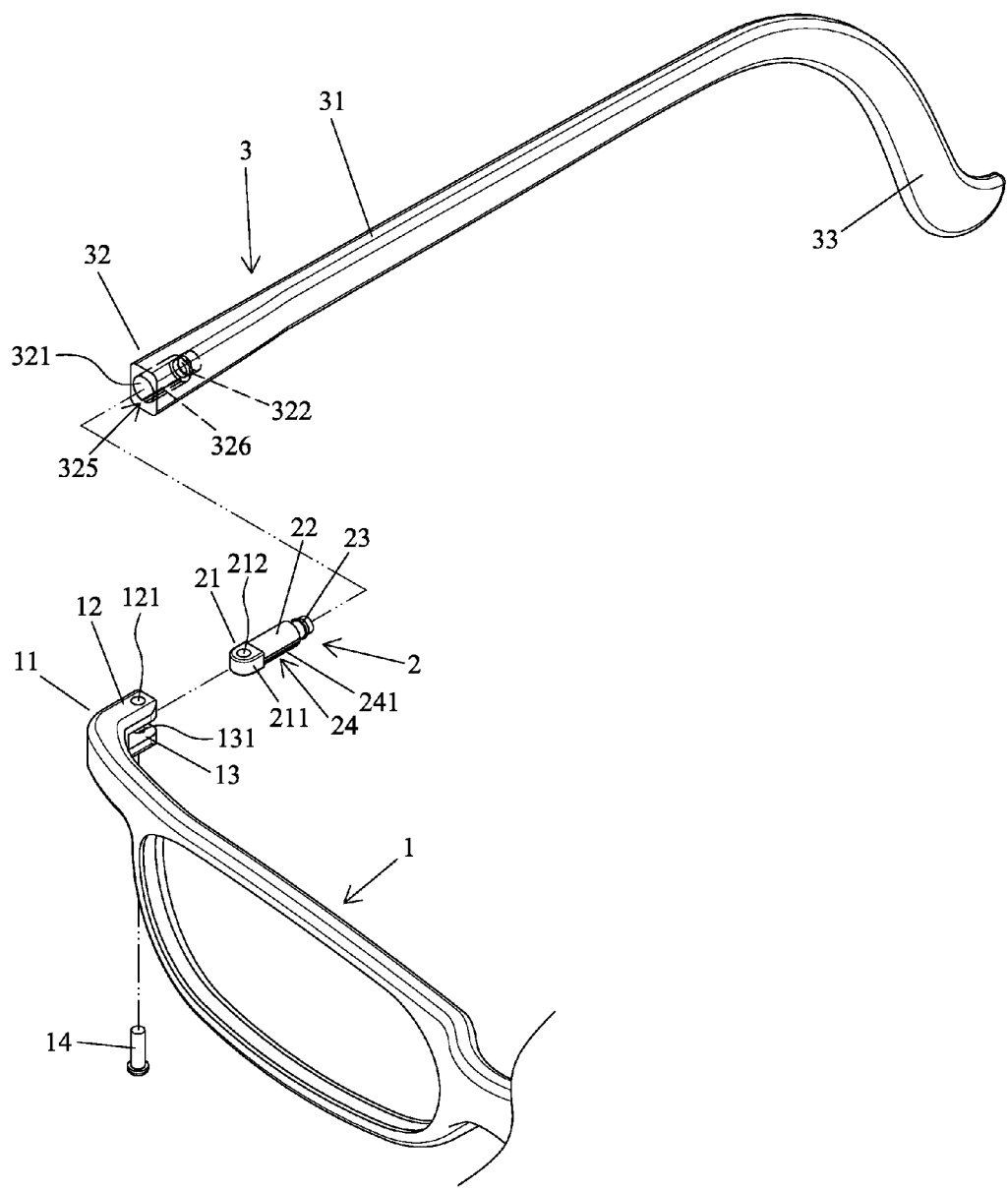
F I G . 1

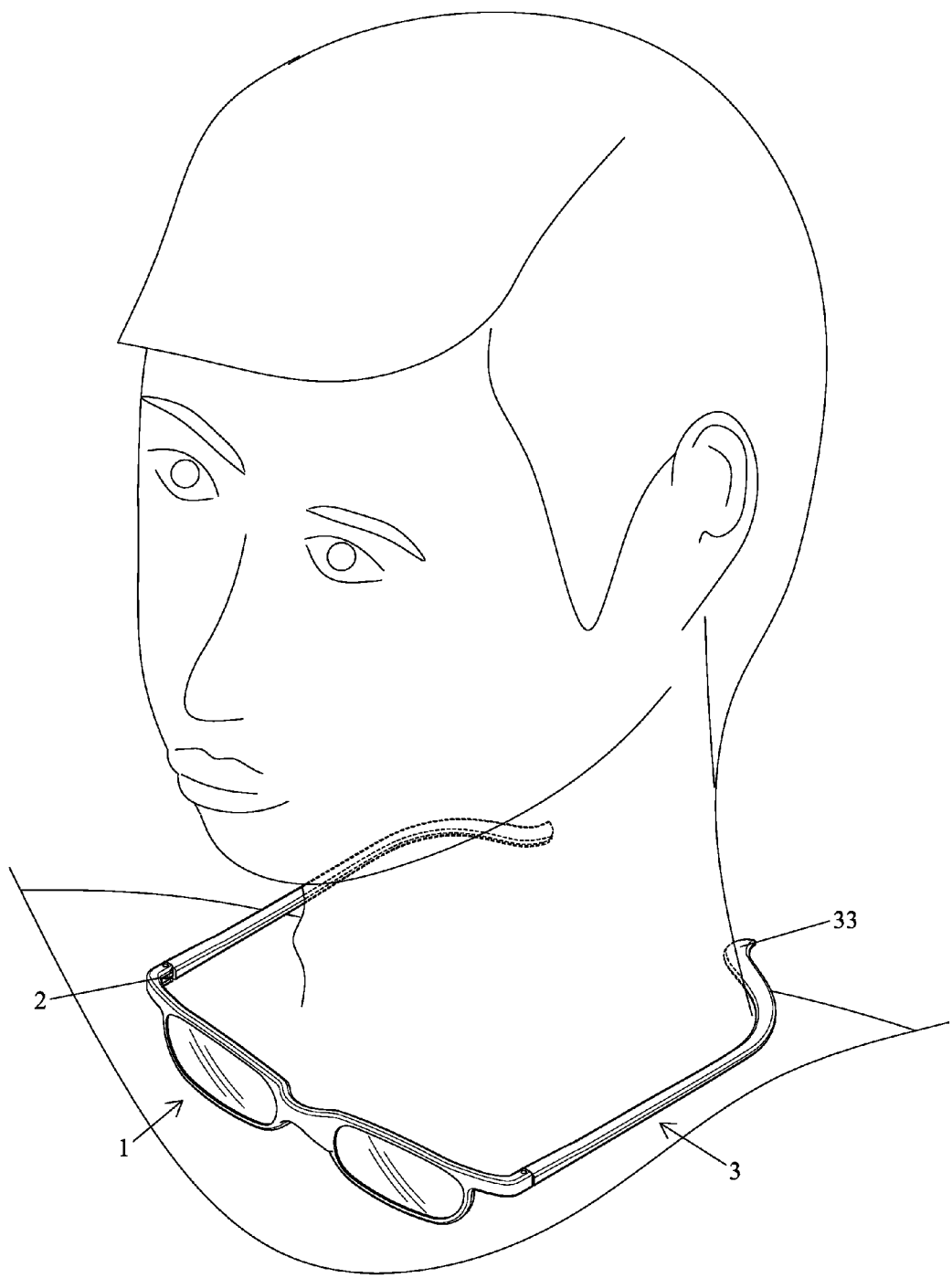
F I G . 6

TEMPLE ASSEMBLY FOR EYEGLASSES

BACKGROUND OF THE INVENTION

The present invention relates to a temple assembly for eyeglasses and, more particularly, to a temple assembly that can be worn on an ear of a user when in use and that can be hung on the neck of the user when not in use, providing enhanced use convenience.

Eyeglasses are one of personal articles and generally include two temples pivotably connected to two sides of a frame. Each temple includes a downwardly extending hook for hooking on one of the ears of a user, such that the eyeglasses can be worn on the face of the user.

Sunglasses are only used in strong sunlight and have to be removed in the night time or a dark environment. Eyeglasses for presbyopia are generally worn for reading or seeing near objects and are not suitable for long-term use. Although the temples can be folded to reduce the volume, a space for placing the eyeglasses is still required when not in use, which is inconvenient to use and carriage.

To overcome the above disadvantages, a cord is interconnected between rear ends of two temples of the eyeglasses. When not in use, the cord can rest around the back of the neck of the user, such that the eyeglasses can be hung in front of the chest of the user to permit easy carriage. However, the cord increases the cost and the weight of the eyeglasses in addition to uncomfortable wearing.

BRIEF SUMMARY OF THE INVENTION

An objective of the present invention is to provide a temple assembly that can be worn on an ear of a user when in use and that can be hung on the neck of the user when not in use, providing enhanced use convenience.

Eyeglasses according to the present invention includes a frame, two connecting blocks, and two temples. Each of two sides of the frame includes a coupling portion. Each of the two connecting blocks includes a front end and a rear end. The front end of each of the two connecting blocks includes a coupling portion pivotably connected to the coupling portion of one of the two sides of the frame, permitting each of the two connecting blocks to be pivotable relative to the frame between an extended position and a folded position. The rear end of each of the two connecting blocks includes an axle having an outer periphery with a first positioning portion. Each of the two temples includes a shank having a front end and a rear end. The rear end of the shank of each of the two temples bends downwards and has a hook adapted to be hooked on an ear of a user. The front end of the shank of each of the two temples includes a receiving portion having a receptacle. The receptacle of each of the two temples receives the axle of one of the two connecting blocks. A disengagement prevention mechanism is provided between each of the two temples and one of the two connecting blocks, such that the two temples are respectively pivotable relative to the two connecting blocks while preventing the two temples from disengaging from the two connecting blocks. The receptacle of each of the two temples includes an inner periphery having a second positioning portion. The second positioning portion of the receptacle of each of the two temples engages with the first positioning portion of one of the two connecting blocks, such that each of the two temples is pivotable relative to one of the two connecting blocks to change an angular position of the hook of each of the two temples. The first and second positioning portions engage with each other to fix the angular position of the hook.

In an example, each of the two connecting blocks further includes a stop protruding rearwards from a rear end of the axle thereof. The receptacle of each of the two temples includes an inner periphery having an inner ledge. The inner ledge of each of the two temples engages with the stop of one of the two connecting blocks. The inner ledge of each of the two temples and the stop of one of the two connecting blocks together form the disengagement prevention mechanism.

The stop of each of the two connecting blocks can include a front end having an abutment face and a rear end. The stop of each of the two connecting blocks can further include an inclined guiding face having increasing diameters from the rear end of the stop towards the front end of the stop. The inner ledge of each of the two temples includes a front end, a rear end, and an inner inclined guiding face having increasing diameters from the front end towards the rear end of the inner ledge. The inner ledge of each of the two temples can further include an inner abutment face abutting the abutment face of the stop of one of the two connecting blocks and located behind the inner inclined guiding face.

In another example, the eyeglasses further includes two elastic connection devices respectively received in the receptacles of the two temples. Each of the two elastic connection devices includes an elastic element, a rod, and a positioning plate. The receiving portion of each of the two temples includes a front end having an abutment section for pressing against a side of one of the coupling portions of the frame. The axle of each of the two connecting blocks includes an engagement hole extending in an axial direction thereof. The positioning plate of each of the two elastic connection devices is fixed in an intermediate portion of the receptacle of one of the two temples and has a through-hole in a center thereof. The rod of each of the two elastic connection devices includes an enlarged rear end and a front end extending through the through-hole of the positioning plate and engaged with the engagement hole of one of the connecting blocks. The elastic element is a compression spring and has two ends respectively abutting the enlarged rear end of the rod and the positioning plate. Each of the two temples and one of the two elastic connection devices provide a clamping force when the abutment sections of the two temples press against the coupling portions of the frame and compress the compression springs. Each of the two temples securely engages with and is pivotable relative to one of the two connecting blocks. Each of the two elastic connection devices and the axle of one of the two connecting blocks together form the disengagement prevention mechanism.

The first positioning portion of each of the two connecting blocks can include a plurality of positioning grooves in different angular positions. The second positioning portion of each of the two connecting blocks can include a positioning member engaged in one of the plurality of positioning grooves of one of the two connecting blocks.

In an example, the plurality of positioning grooves of the first positioning portion of each of the two connecting blocks extends 90°. The first positioning portion of each of the two connecting blocks includes two stop edges between which the plurality of positioning grooves is located.

The present invention will become clearer in light of the following detailed description of illustrative embodiments of this invention described in connection with the drawings.

DESCRIPTION OF THE DRAWINGS

FIG. 1 is a partial, perspective view of eyeglasses of a first embodiment according to the present invention.

FIG. 6 is a perspective view similar to FIG. 4, illustrating the eyeglasses hung on the neck of the user when not in use.

DETAILED DESCRIPTION OF THE INVENTION

Figures 2, 2A:
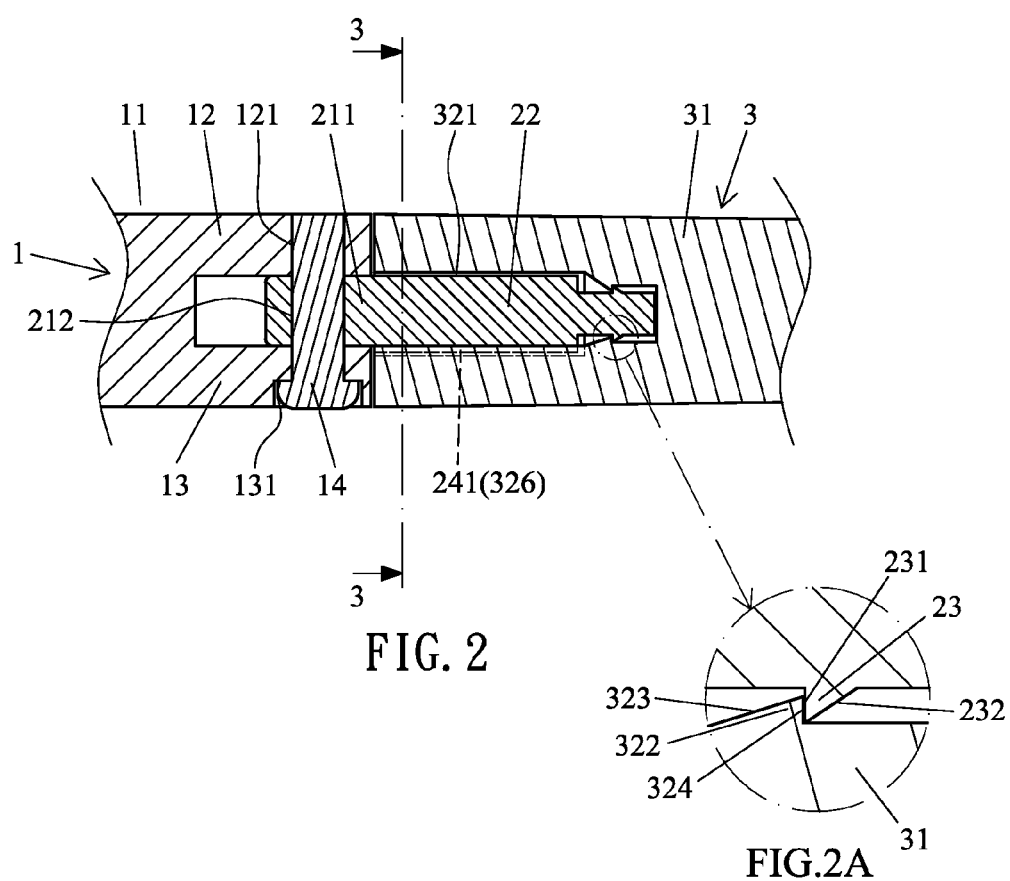
FIG. 2 is a cross sectional view of a portion of the eyeglasses of FIG. 1.
FIG. 2A is an enlarged view of a circled portion of FIG. 2.

In the illustrated embodiments, like reference numbers are used to designate like parts.

With reference to FIGS. 1, 2, 2A, 3, and 3A, eyeglasses of a first embodiment according to the present invention includes a frame 1, two connecting blocks 2, and two temples 3. FIGS. 1, 2, 2A, 3, and 3A only show a half of the frame 1, one of the connecting blocks 2, and one of the two temples 3. The other half of the frame 1 is of a symmetric structure. Each of two sides of the frame 1 includes a coupling portion 11 having upper and lower lugs 12 and 13 having aligned pivot holes 121 and 131.

The two connecting blocks 2 are pivotably connected to the coupling portions 11 of the frame 1, respectively. Specifically, a front end of each of the two connecting blocks 2 includes a coupling portion 21 pivotably connected to the coupling portion 11 of one of the two sides of the frame 1. The coupling portion 21 of each of the two connecting blocks 2 includes an ear 211 having a pivot hole 212. The ear 211 of each of the two connecting blocks 2 is received between the upper and lower lugs 12 and 13 of one of the coupling portions 11, and a pivot 14 extends through the pivot holes 121, 131, and 212, permitting each of the two connecting blocks 2 to be pivotable relative to the frame 1 between an extended position and a folded position. A rear end of each of the two connecting blocks 2 includes an axle 22 that is substantially cylindrical. A stop 23 protrudes rearwards from a rear end of the axle 22 of each of the two connecting blocks 2. The stop 23 of each of the two connecting blocks 2 includes a front end having an abutment face 231 and a rear end. The stop 23 of each of the two connecting blocks 2 further includes an inclined guiding face 232 having increasing diameters from the rear end of the stop 23 towards the front end of the stop 23. The axle 22 of each of the two connecting blocks 2 has an outer periphery with a first positioning portion 24. The first positioning portion 24 of each of the two connecting blocks 2 includes a plurality of positioning grooves 241 in different angular positions. In this embodiment, the positioning grooves 241 of the first positioning portion 24 of each of the two connecting blocks 2 extend 90°. Furthermore, the first positioning portion 24 of each of the two connecting blocks 2 includes two stop edges 242 between which the positioning grooves 241 are located.

Each of the two temples 3 includes a shank 31 that is substantially rectilinear in this embodiment. A rear end of the shank 31 of each of the two temples 3 bends downwards and has a hook 33 adapted to be hooked on an ear of a user. A front end of the shank 31 of each of the two temples 3 includes a receiving portion 32 having a receptacle 321. The receptacle 321 of each of the two temples 3 receives the axle 22 of one of the two connecting blocks 2. The receptacle 321 of each of the two temples 3 includes an inner periphery having an inner ledge 322 engaged with the stop 23 of one of the two connecting blocks 2. The inner ledge 322 of each of the two temples 3 includes a front end, a rear end, and an inner inclined guiding face 323 having increasing diameters from the front end towards the rear end of the inner ledge 322. The inner ledge 322 of each of the two temples 3 further includes an inner abutment face 324 abutting the abutment face 231 of the stop 23 of one of the two connecting blocks 2 and located behind the inner inclined guiding face 323. The inner ledge 322 of each of the two temples 3 and the stop 23 of one of the two connecting blocks 2 together form the disengagement prevention mechanism. Thus, the two temples 3 are respectively pivotable relative to the two connecting blocks 2 while preventing the two temples 3 from disengaging from the two connecting blocks 2. The receptacle 321 of each of the two temples 3 includes an inner periphery having a second positioning portion 325 for engaging with the first positioning portion 24 of one of the two connecting blocks 2, such that each of the two temples 3 is pivotable relative to one of the two connecting blocks 2 to change an angular position of the hook 33 of each of the two temples 3. Namely, the first and second positioning portions 24 and 325 engage with each other to fix the angular position of the hook 33. In this embodiment, the second positioning portion 325 of each of the two connecting blocks 2 includes a positioning member 326 engaged in one of the positioning grooves 241 of one of the two connecting blocks 2.

Figure 3A:
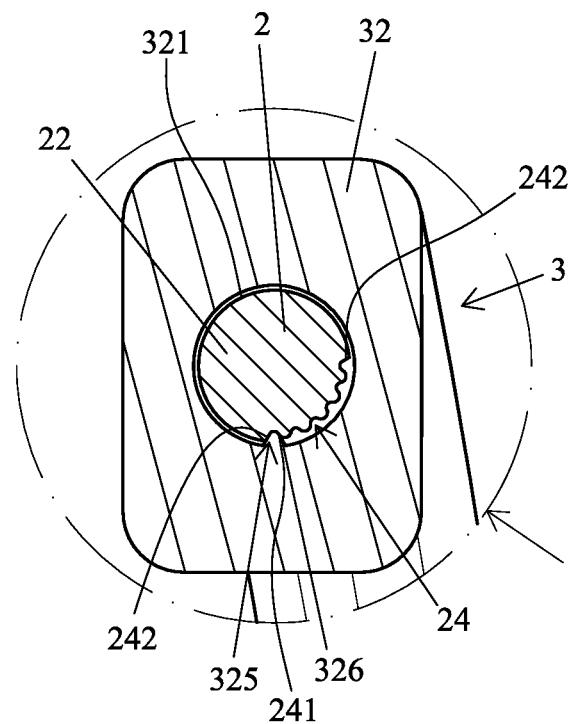
FIG. 3A is an enlarged view of a circled portion of FIG. 3.
Figure 3:
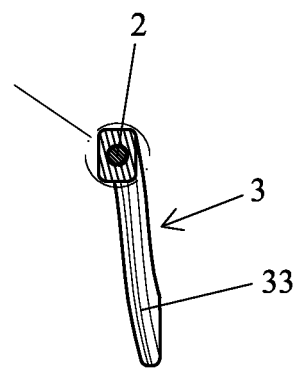
FIG. 3 is a cross sectional view taken along section line 3-3 of FIG. 2, illustrating a temple of the eyeglasses in use.
Figure 4:
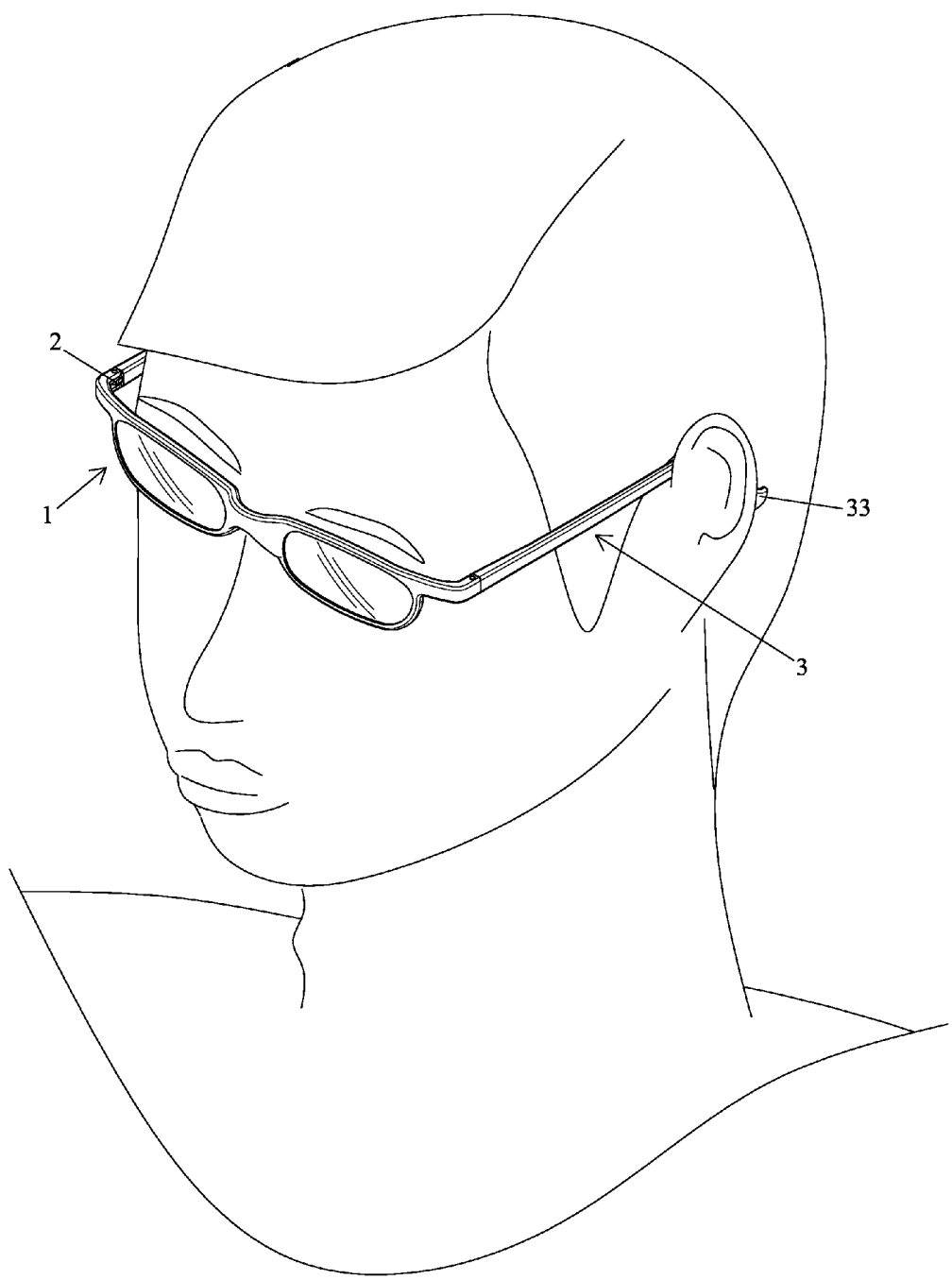
FIG. 4 is a perspective view illustrating a user wearing the eyeglasses of FIG. 1.

With reference to FIGS. 3, 3A, and 4, the hook 33 of each of the two temples 3 can be in a position facing downwards to permit the eyeglasses to be worn on the face of the user. The relative angular position between each of the two temples 3 and one of the connecting blocks 2 can be adjusted to change the angular position of the hooks 33 to match the shapes of the heads of the user, such that the hooks 33 can be reliably hung on the ears of the user.

Figure 5A:
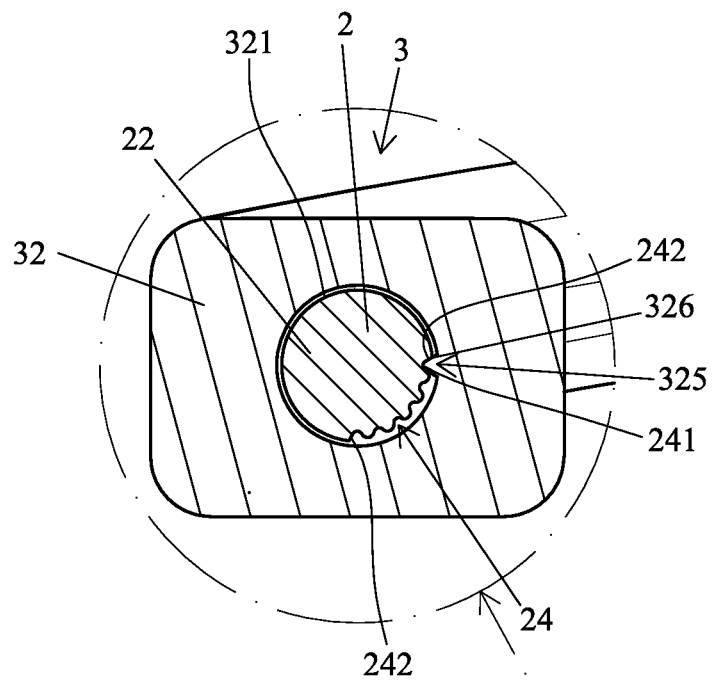
FIG. 5A is an enlarged view of a circled portion of FIG. 5.
Figure 5:
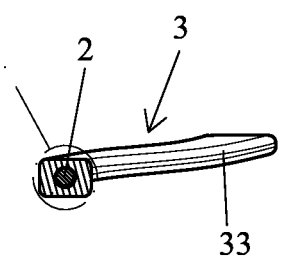
FIG. 5 is a view similar to FIG. 3, with the temple pivoted to a non-use position.
Figure 7:
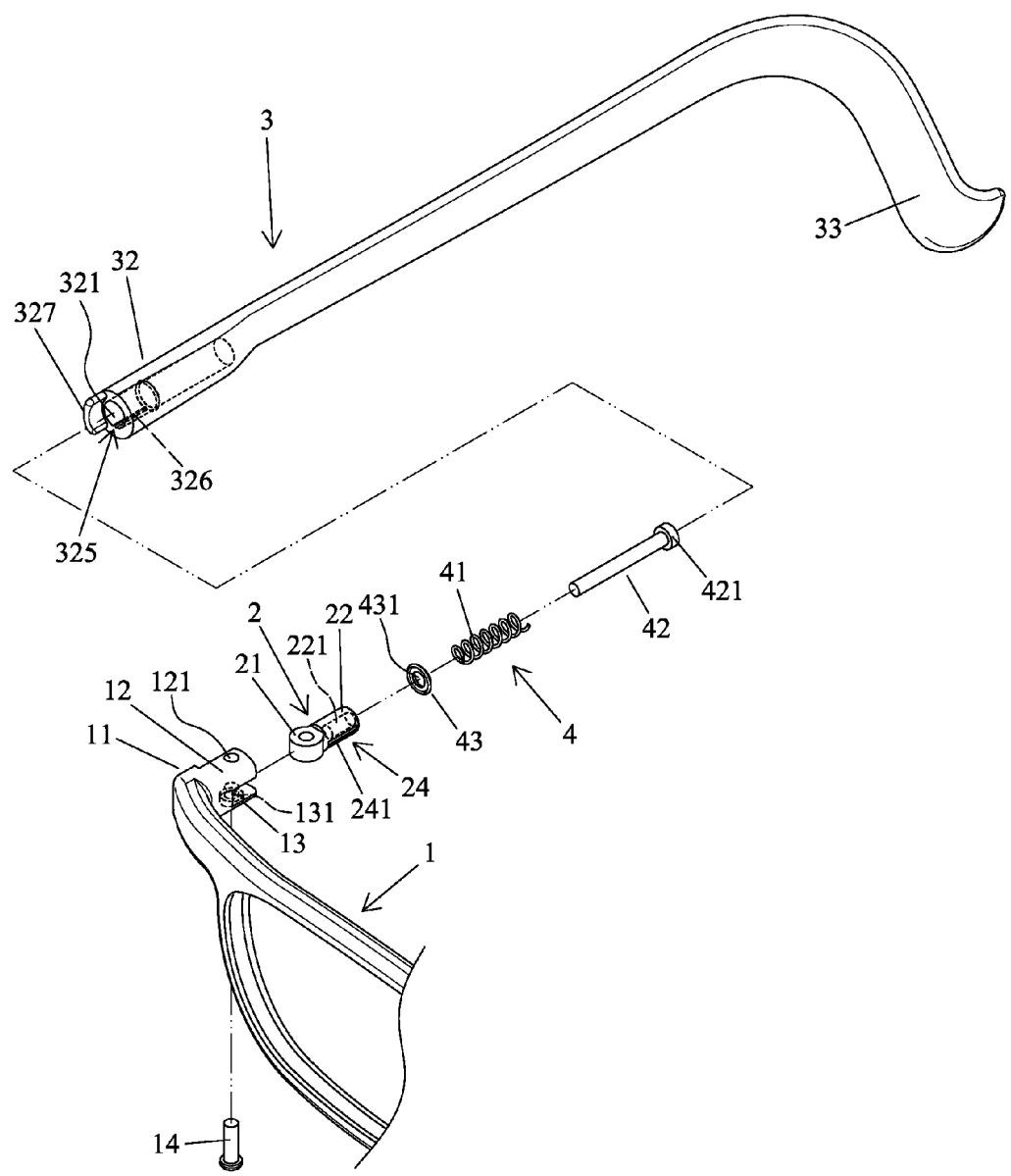
FIG. 7 is a partial, perspective view of eyeglasses of a second embodiment according to the present invention.
Figure 8:
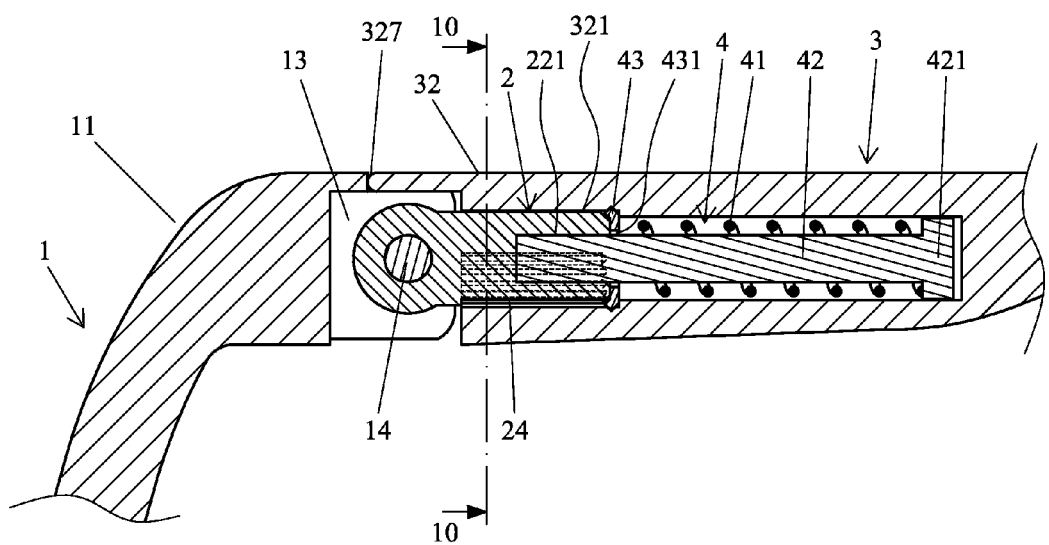
FIG. 8 is a partial, cross sectional view of the eyeglasses of FIG. 7.

With reference to FIGS. 5, 5A, and 6, when the user is not wearing the eyeglasses, the two temples 3 are pivoted relative to the two connecting blocks 2, such that the hooks 33 of the two temples 3 pivot inwards to a position in which the end edges of the hooks 33 align with each other, and each positioning member 326 is engaged and positioned in one of the positioning grooves 241. Thus, the hooks 33 can be hung on the neck of the user to permit easy carriage.

FIGS. 7-10 and 10A illustrate a second embodiment of the present invention which is substantially the same as the first embodiment. The main differences are that the second embodiment includes two elastic connection devices 4 which provide the function of the disengagement prevention mechanism and which are respectively received in the receptacles 321 of the two temples 3. Each of the two elastic connection devices 4 includes an elastic element 41, a rod 42, and a positioning plate 43. The receiving portion 32 of each of the two temples 3 includes a front end having an abutment section 327 for pressing against a side of one of the coupling portions 11 of the frame 1. The abutment section 327 is an arcuate protrusion in this embodiment. The axle 22 of each of the two connecting blocks 2 includes an engagement hole 221 extending in an axial direction thereof. Each of the two elastic connection devices 4 and the axle 22 of one of the two connecting blocks 2 together form the disengagement prevention mechanism, which is similar to that formed by each stop 23 and one of the inner ledges 322 in the first embodiment.

The positioning plate 43 of each of the two elastic connection devices 4 is fixed in an intermediate portion of the receptacle 321 of one of the two temples 3 and has a through-hole 431 in a center thereof. The rod 42 of each of the two elastic connection devices 4 includes an enlarged rear end 421 and a front end extending through the through-hole 431 of the positioning plate 43 and engaged with the engagement hole 221 of one of the connecting blocks 2. The elastic element 41 is a compression spring having two ends respectively abutting the enlarged rear end 421 of the rod 42 and the positioning plate 43. Each of the two temples 3 is coupled to one of the two connecting blocks 2 by one of the two elastic connection devices 4 without the risks of disengaging from the one of the connecting blocks 2 and can pivot relative the one of the two connecting blocks 2.

Figure 9:
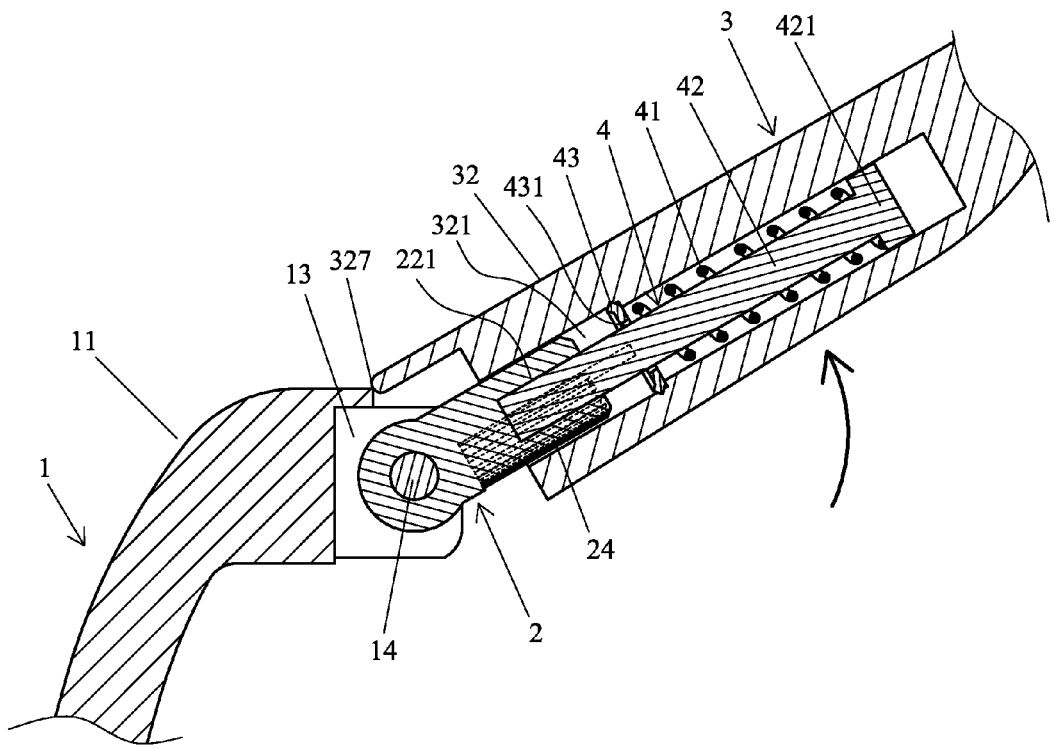
FIG. 9 is a view similar to FIG. 8, with a temple of the eyeglasses pivoted outwards to compress an elastic element.

When the temples 3 move outward relative to the frame 1, each of the two temples 3 and one of the two elastic connection devices 4 provide a clamping force when the abutment sections 327 of the two temples 3 press against the coupling portions 11 of the frame 1 and compress the elastic elements 41 in the form of compression springs, as shown in FIG. 9.

Figures 10, 10A:
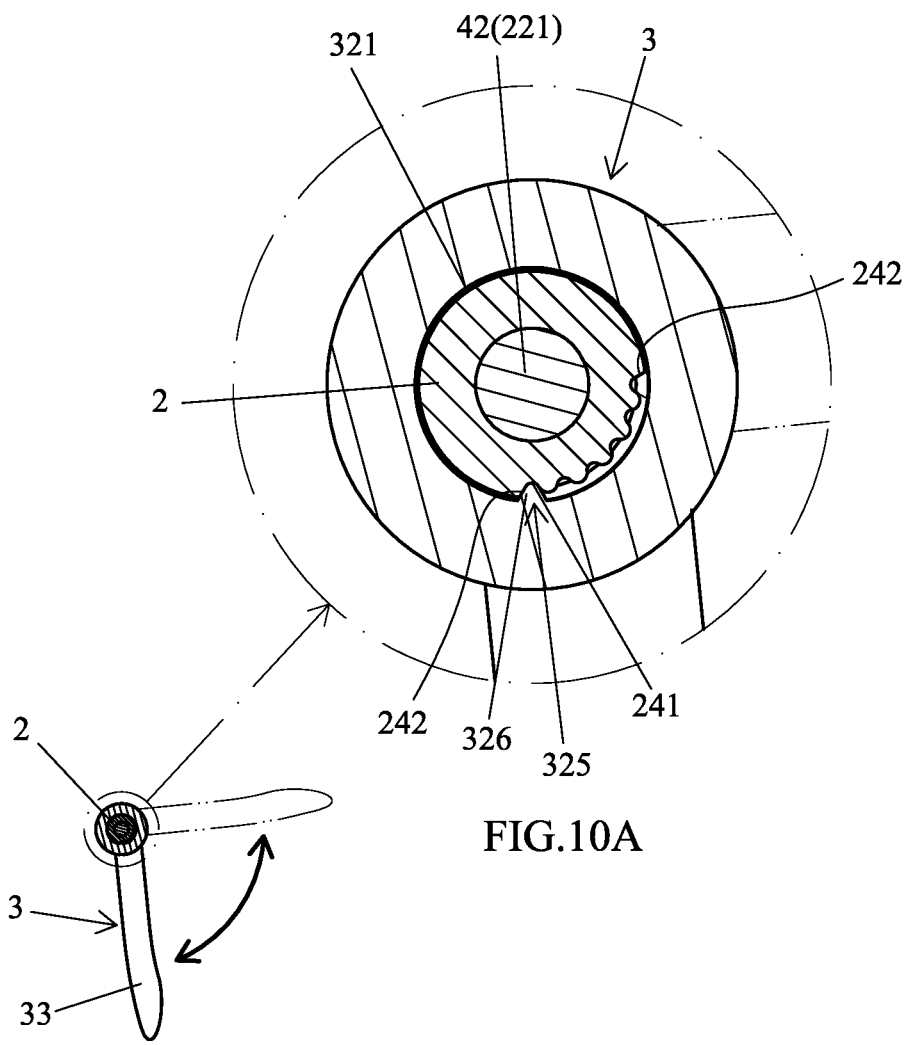
FIG. 10 is a cross sectional view taken along section line 10-10 of FIG. 8, illustrating pivotal movement of the temple for adjusting an angular position of a hook of the temple.
FIG. 10A is an enlarged view of a circled portion of FIG. 10.

With reference to FIGS. 10 and 10A, when in use, the hook 33 of each of the two temples 3 can be in a position facing downwards to permit the eyeglasses to be worn on the face of the user, and the hooks 33 can be reliably hung on the ears of the user (see the solid lines in FIG. 10).

As shown by the phantom lines in FIG. 10, when the user is not wearing the eyeglasses, the two temples 3 are pivoted relative to the two connecting blocks 2, such that the hooks 33 of the two temples 3 pivot inwards to a position in which the end edges of the hooks 33 align with each other, and each positioning member 326 is engaged and positioned in one of the positioning grooves 241. Thus, the hooks 33 can be hung on the neck of the user to permit easy carriage.

Thus, the second embodiment provides both advantages of easy wearing by the clamping forces when in use and easy carriage when not in use.

In view of the foregoing, the eyeglasses according to the present invention can be hung on the neck of the user without using a cord and without increasing the overall weight of the eyeglasses while providing wearing comfort.

Although specific embodiments have been illustrated and described, numerous modifications and variations are still possible without departing from the scope of the invention. The scope of the invention is limited by the accompanying claims.

The invention claimed is:

1. Eyeglasses comprising:
a frame including two sides, with each of the two sides of the frame including a coupling portion;
two connecting blocks, with each of the two connecting blocks including a front end and a rear end, with the front end of each of the two connecting blocks including a coupling portion pivotably connected to the coupling portion of one of the two sides of the frame, permitting each of the two connecting blocks to be pivotable relative to the frame between an extended position and a folded position, and with the rear end of each of the two connecting blocks including an axle having an outer periphery with a first positioning portion; and
two temples, with each of the two temples including a shank having a front end and a rear end, with the rear end of the shank of each of the two temples bending downwards and having a hook adapted to be hooked on an ear of a user, with the front end of the shank of each of the two temples including a receiving portion having a receptacle, with the receptacle of each of the two temples receiving the axle of one of the two connecting blocks, with a disengagement prevention mechanism provided between each of the two temples and one of the two connecting blocks, such that the two temples are respectively pivotable relative to the two connecting blocks while preventing the two temples from disengaging from the two connecting blocks, with the receptacle of each of the two temples including an inner periphery having a second positioning portion, with the second positioning portion of the receptacle of each of the two temples engaged with the first positioning portion of one of the two connecting blocks, such that each of the two temples is pivotable relative to one of the two connecting blocks to change an angular position of the hook of each of the two temples, and with the first and second positioning portions engaged with each other to fix the angular position of the hook.

2. The eyeglasses as claimed in claim 1, further comprising two elastic connection devices respectively received in the receptacles of the two temples, with each of the two elastic connection devices including an elastic element, a rod, and a positioning plate, with the receiving portion of each of the two temples including a front end having an abutment section for pressing against a side of one of the coupling portions of the frame, with the axle of each of the two connecting blocks including an engagement hole extending in an axial direction thereof, with the positioning plate of each of the two elastic connection devices fixed in an intermediate portion of the receptacle of one of the two temples and having a through-hole in a center thereof, with the rod of each of the two elastic connection devices including an enlarged rear end and a front end extending through the through-hole of the positioning plate and engaged with the engagement hole of one of the connecting blocks, with the elastic element being a compression spring and having two ends respectively abutting the enlarged rear end of the rod and the positioning plate, with each of the two temples and one of the two elastic connection devices providing a clamping force when the abutment sections of the two temples press against the coupling portions of the frame and compress the compression springs, with each of the two temples securely engaged with and pivotable relative to one of the two connecting blocks, and with each of the two elastic connection devices and the axle of one of the two connecting blocks together forming the disengagement prevention mechanism.

3. The eyeglasses as claimed in claim 1, with each of the two connecting blocks further including a stop protruding rearwards from a rear end of the axle thereof, with the receptacle of each of the two temples including an inner periphery having an inner ledge, with the inner ledge of each of the two temples engaged with the stop of one of the two connecting blocks, and with the inner ledge of each of the two temples and the stop of one of the two connecting blocks together forming the disengagement prevention mechanism.

4. The eyeglasses as claimed in claim 3, with the stop of each of the two connecting blocks including a front end having an abutment face and a rear end, with the stop of each of the two connecting blocks further including an inclined guiding face having increasing diameters from the rear end of the stop towards the front end of the stop, with the inner ledge of each of the two temples including a front end, a rear end, and an inner inclined guiding face having increasing diameters from the front end towards the rear end of the inner ledge, and with the inner ledge of each of the two temples further including an inner abutment face abutting the abutment face of the stop of one of the two connecting blocks and located behind the inner inclined guiding face.

5. The eyeglasses as claimed in claim 1, with the first positioning portion of each of the two connecting blocks including a plurality of positioning grooves in different angular positions, and with the second positioning portion of each of the two connecting blocks including a positioning member engaged in one of the plurality of positioning grooves of one of the two connecting blocks.

6. The eyeglasses as claimed in claim 5, wherein the plurality of positioning grooves of the first positioning portion of each of the two connecting blocks extends 90°, and wherein the first positioning portion of each of the two connecting blocks includes two stop edges between which the plurality of positioning grooves is located.

* * * * *